US006046959A

United States Patent [19]

Salmi et al.

[11] Patent Number: 6,046,959

[45] Date of Patent: Apr. 4, 2000

[54] SOUND SOURCE ARRANGEMENT

[75] Inventors: Pekka Salmi, Vantaa; Pekka Jaakola, Helsinki; Erkki Jalkanen, Kaskisto, all of Finland

[73] Assignee: Kvaerner Masa-Yards Oy, Helsinki, Finland

[21] Appl. No.: 09/146,060

[22] Filed: Sep. 2, 1998

[30] Foreign Application Priority Data

Sep. 5, 1997 [FI] Finland .................................... 973604

[51] Int. Cl.[7] ........................................ G01V 1/38

[52] U.S. Cl. ........................................ 367/57; 367/23

[58] Field of Search .................................... 367/120, 116, 367/144, 149, 154, 18, 57, 23, 22; 702/20

[56] References Cited

U.S. PATENT DOCUMENTS

| | | | |
|---|---|---|---|
| 3,696,329 | 10/1972 | Hazelhurst | 340/7 R |
| 4,038,630 | 7/1977 | Chelminski . | |
| 4,108,272 | 8/1978 | Paitson et al. | 181/120 |
| 4,204,188 | 5/1980 | Weichart et al. . | |
| 4,260,211 | 4/1981 | Mollere | 339/91 |
| 4,500,980 | 2/1985 | Copeland . | |
| 4,631,711 | 12/1986 | Fowler . | |
| 4,641,288 | 2/1987 | McGowan et al. . | |
| 4,648,080 | 3/1987 | Hargreaves | 367/20 |
| 4,715,023 | 12/1987 | Otto | 367/144 |
| 4,745,583 | 5/1988 | Motal | 367/18 |
| 4,812,978 | 3/1989 | Fredriksen | 364/421 |
| 4,858,205 | 8/1989 | Harrison | 367/144 |
| 5,018,115 | 5/1991 | Pascouet | 367/144 |
| 5,046,057 | 9/1991 | Berni | 367/170 |
| 5,144,588 | 9/1992 | Johnston et al. . | |
| 5,185,726 | 2/1993 | Curto et al. . | |
| 5,281,773 | 1/1994 | Duren | 181/111 |
| 5,459,285 | 10/1995 | Curto et al. | 174/88 R |
| 5,561,640 | 10/1996 | Maciejewski . | |
| 5,745,436 | 4/1998 | Bittleston | 367/20 |

FOREIGN PATENT DOCUMENTS 1 421 364 1/1976 United Kingdom .

*Primary Examiner*—Christine K. Oda
*Assistant Examiner*—Victor J. Taylor
*Attorney, Agent, or Firm*—Smith-Hill and Bedell

[57] ABSTRACT

A sound source arrangement for use in carrying out a seismic survey comprises flexible structural modules connected together end-to-end to form an elongated flexible structure of substantially uniform exterior cross-sectional shape and size. The elongated flexible structure can be stored on a reeling unit and may be unwound from the reeling unit at a survey location and wound back onto the reeling unit without disconnecting the modules from one another. At least one of the flexible modules is an air gun module which includes a device for producing sound impulses.

10 Claims, 4 Drawing Sheets

7 10 9 6 10 7 9

1
3
4
2
5

5
8
6
7
6
7
6
7
6
7

7
10
9
10

11
12
12

7
10
10
7
9
6
9

7
7
9
10
6
10
9

6
14
13
13
14

15
10
7
21
16
17
18
21
9

21
9
20
19
10
21

SOUND SOURCE ARRANGEMENT

BACKGROUND OF THE INVENTION

This invention relates to a sound source and measurement arrangement for seismic surveys, which arrangement is especially intended for use in a body of water, particularly in icy water. The sound source and measurement arrangement may also be used in shallow water, water with mud flats, muddy water and water with dense vegetation.

Sound source and measurement arrangements towed by a vessel are known for example from U.S. Pat. No. 5,144,588 and U.S. Pat. No. 5,185,726, according to which towed devices may be set to move at a desired depth by means of buoys or the like. Known sound source devices are shown in U.S. Pat. No. 5,018,115. The measurement devices may be towed by the same vessel as the sound source devices. Alternatively, the measurement devices may be towed by a different vessel from the sound source devices.

The known sound source arrays, especially composed of air guns, suitable for towing by a vessel are complicated and their handling during launching and retrieval is troublesome and requires special arrangements. The known devices are not suitable for use in ice-covered waters, because they are easily jammed among ice blocks and thereby damaged.

Further, such a known air gun usually has several cables, e.g. for supply of power, outside the external shell of the air gun. These cables are easily entangled in vegetation or ice blocks, or in other obstructions such as abandoned fishing gear, nets and wrecks.

U.S. Pat. No. 4,038,630 shows an arrangement with energy sources situated in a flexible tube and towed by a wire. Signals and energy are transmitted between the vessel and the equipment in the flexible tube through a separate transmission cable. The arrangement shown is not easily modified. The arrangement is said to be flexible so that it may be pulled out of the water over transport rolls into a vessel, but there is no reference to storage on a drum.

Depth control of devices towed in water by adjusting the buoyancy is known from GB 1,421,364 and U.S. Pat. No. 4,745,583, using elements with a volume that varies in response to changes in the amount of enclosed medium. Devices of this kind are not suitable for being reeled on a drum.

The assembly of a survey arrangement, i.e. the relative locations of the various functional components of the survey arrangement, must be easily changeable to suit different survey and maintenance situations. U.S. Pat. No. 4,631,711 shows an arrangement in which, at one side of a survey device, there is a recess for removably receiving a cartridge, which allows the cartridge to be exchanged. It is not easy to change the length of the device shown in U.S. Pat. No. 4,631,711.

For simple listening and measurement operations, devices mainly without projecting parts, so-called streamers, are known, as shown in U.S. Pat. No. 4,641,288. It is not possible to provide such a device with, for example, air guns, which require more space than is available in a conventional streamer.

It is an object of the invention to provide a sound source arrangement for survey purposes whose handling during launching and retrieval is easy and fast and is feasible also in bodies of water containing ice blocks or dense vegetation. In the event that there is a need to vary the equipment assembly, a modifiable structure is preferred. Another object is to provide a survey arrangement with a small cross-section allowing incorporation of all necessary means and devices, while maintaining sufficient flexibility that it is possible to store the arrangement reeled on a drum.

SUMMARY OF THE INVENTION

A sound source arrangement according to the invention includes a number of flexible structural modules connected at their ends one after another and being approximately of the same size in cross-section. Thus, the modules form together a cable-like assembly, the handling of which during launching as well as during retrieval is easy and fast. Since the modules have a basically uniform exterior cross-section, the assembly does not include discontinuity sections or projections, which could be obstructed by objects in the water, for example ice blocks or vegetation or other obstructions, such as abandoned fishing gear, nets or wrecks. Since the modules are flexible, the assembly may be reeled on a drum, so it is not necessary to disassemble the assembly for storing. The modular structure makes it possible to vary the equipment configuration according to actual survey requirements. Further, when the assembly is reeled on a drum, it may easily be moved from a vessel to land or to another vessel or to a shipping container, such as a standardized ISO container. When the reel is loaded in a standardized ISO shipping container, it can be easily transported from place to place and positioned for use without difficult operations. In a survey vessel, the invention provides improved possibilities for arranging required spaces and functions.

A sound source arrangement according to the invention can be used for seismic or seismic-acoustic surveys in a body of water. It may, under special circumstances, be used also in other terrain areas, such as snow fields, transition zones or mud or marsh, or on shallow water bottoms.

The arrangement may include or be used in conjunction with a compressor aboard the towing vessel. The compressor is connected to the pulling end of the cable-like assembly and the arrangement further includes devices for leading compressed gas, such as air, from the compressor to the air gun module for supply to the device for producing sound impulses. All the connections and devices needed for this are well protected inside the assembly. The device for producing sound impulses may include known means, such as a valve, for discharging compressed gas at very high pressure, e.g. 200 bar, into the body of water and thereby generating a pressure (sound) impulse in the water. The valve of a device for producing sound impulses may have a response time (the time taken to change from closed to fully open) of about 1 ms. The device for producing sound impulses may include known means for controlling the duration of the sound impulses, which may be 10–80 ms, and the interval between consecutive sound impulses, typically 5–30 s.

Several of the flexible modules may be air gun modules, each including a device for producing sound impulses. Depending on the survey requirements, the valves of the respective devices may open simultaneously or they may open in succession, with a small delay between the opening of successive valves. Hence, the survey arrangement can flexibly operate in the desired manner for producing sound impulses and one may repeatedly produce identical sound impulses.

The air gun module may include a flexible, cellular layer for buoyancy control. In this case, the module also includes devices, such as conventional valves and pipes, for filling the cellular mass partly or totally with a medium from the surroundings, so that the buoyancy of the module may be controlled, for achieving and maintaining the desired operating depth during survey work.

The floating depth of the cable-like assembly may be controlled by feeding it with gas such as air and/or by using, additionally, active and/or passive depth control devices of known construction, such as fins. Use of depth control devices speeds up reaching of the desired operation depth and makes it easy to keep the assembly at the desired operation depth. However, use of fins may not be appropriate in icy waters or in vegetation.

A connection means positioned in a well protected area at each end of each flexible module provides automatic connection of the energy and signal transmission lines when the modules are connected to one another. Thereby modification and assembly and disassembly of the survey arrangement, particularly for maintenance or replacement of a module, can be easily accomplished.

Even though cables for necessary electricity or other energy and reinforcement components for achieving adequate tensile strength are integrated into each module, the modules may easily be made in serial fabrication. Also, disassembly, assembly and maintenance is in this case easy and fast. By integrating such cables into the modules, the possibility of the cables becoming entangled or damaged in vegetation or ice blocks is avoided.

The invention also relates to an integral arrangement of a sound producing device (a so-called air gun) and a cable-like assembly including a flexible member and a valve for flow control of high pressure gas, such as air, and discharge apertures for gas and devices for discharge control. The reeling and handling properties of this kind of arrangement are good.

For isolating the survey arrangement from the influence of undesired sound sources, one may generate a bubble zone around a desired portion of the cable-like entity. Such a bubble arrangement is known from U.S. Pat. No. 5,513,149.

BRIEF DESCRIPTION OF THE DRAWINGS

In the following, the invention will be described more in detail with reference to the attached drawing, in which FIG. 1 schematically shows an arrangement according to the invention towed by a vessel, FIG. 2 schematically shows a side view of a portion of the towed unit of FIG. 1, FIG. 3 schematically show a side view of a gun module of the unit of FIG. 2, FIG. 4 schematically show a side view of a floating module of the unit of FIG. 2, FIG. 5 schematically shows a side view of a connection member between two gun modules according to FIG. 3, FIG. 6 schematically shows the completed connection of FIG. 5, FIG. 7 schematically shows a longitudinal section of the connection member of FIG. 5, FIG. 8 schematically shows, partly in section, the end portion of the gun module of FIG. 3, FIG. 9 schematically shows a longitudinal section of the valve portion of a gun module, FIG. 10 schematically shows a section of a flexible chamber, and FIG. 11 schematically shows a side view of the rear end of the arrangement of FIG. 2 prior to the connection of the members.

DETAILED DESCRIPTION

Figure 1:
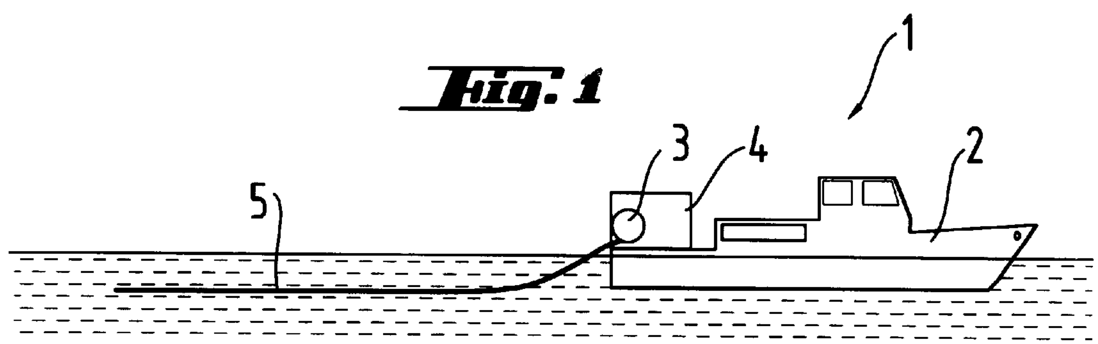

FIG. 1 illustrates a sound source and measurement arrangement 1 for seismic surveys. The arrangement 1 includes towing vessel 2 carrying in a space 4, a powered drum 3, to which a cable-like towed assembly, a so-called gun line 5, is connected. The towed assembly 5 can be reeled on the drum partly or totally.

Figure 2:
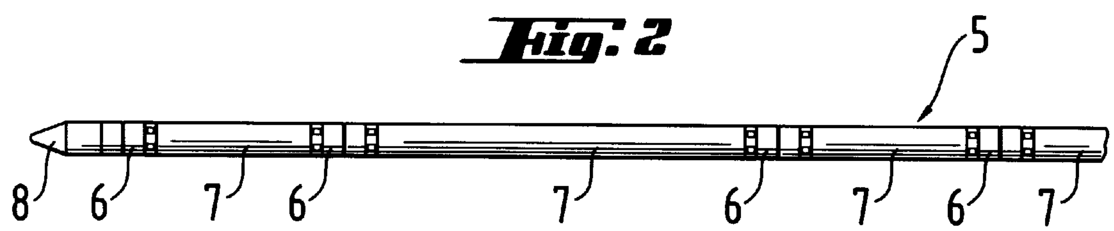
Figure 3:
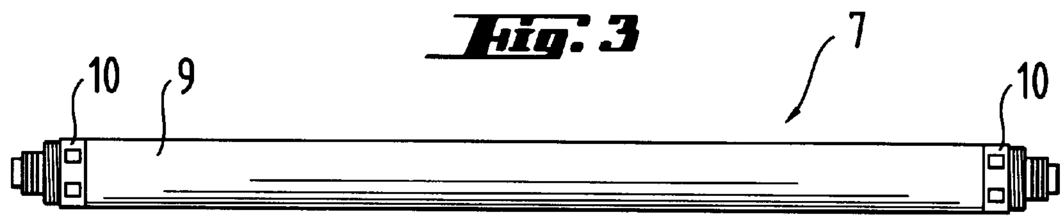
Figure 4:
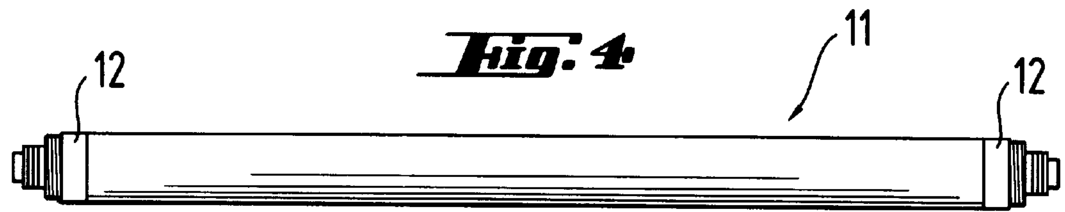

The assembly 5 includes several flexible modules connected together end-to-end by joint members 6 (FIG. 2). The modules include air gun modules 7 (FIG. 3) and floating modules 11 (FIG. 4). The exterior cross-sectional shape and size of the modules 7 and 11 and the joint members 6 is basically uniform, so that the exterior cross-sectional shape and size of the towed assembly is substantially uniform over its length. At the rear end of the assembly 5 there is a terminating member 8.

Figure 5:
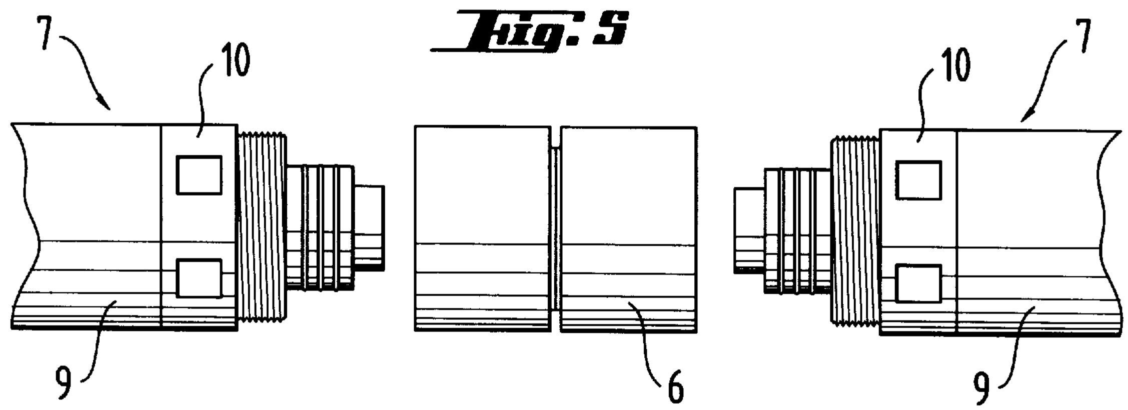
Figure 6:
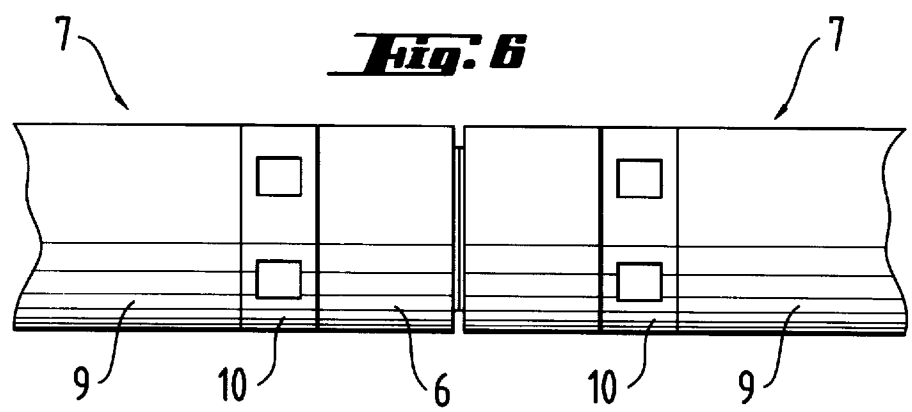

FIGS. 5 and 6 show two air gun modules before (FIG. 5) and after (FIG. 6) being connected together by a joint member 6.

Figure 7:
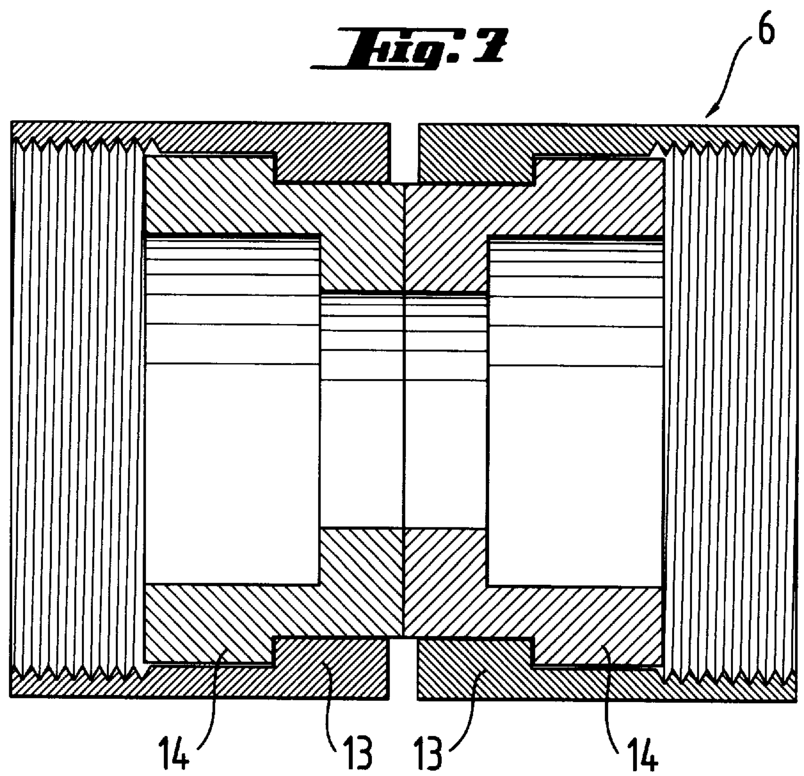

Referring to FIG. 7, the joint member 6 includes two frame portions 14. Each frame portion is fitted in a sleeve-like tightening ring 13 having an internal screwthread. The two frame portions are connected together, for example by screws (not shown). The frame portions 14 are hollow and define a passage extending through the joint member.

The length of a gun module 7 may vary widely, e.g. from 1–10 m, as a rule 1–5 m. The main portion of an air gun module 7, shown in FIG. 3, is a long flexible member 9, which has also the function of a floating member. A connection member 10, for engaging a joint member 6, is attached to each end of the flexible member 9.

Figure 8:
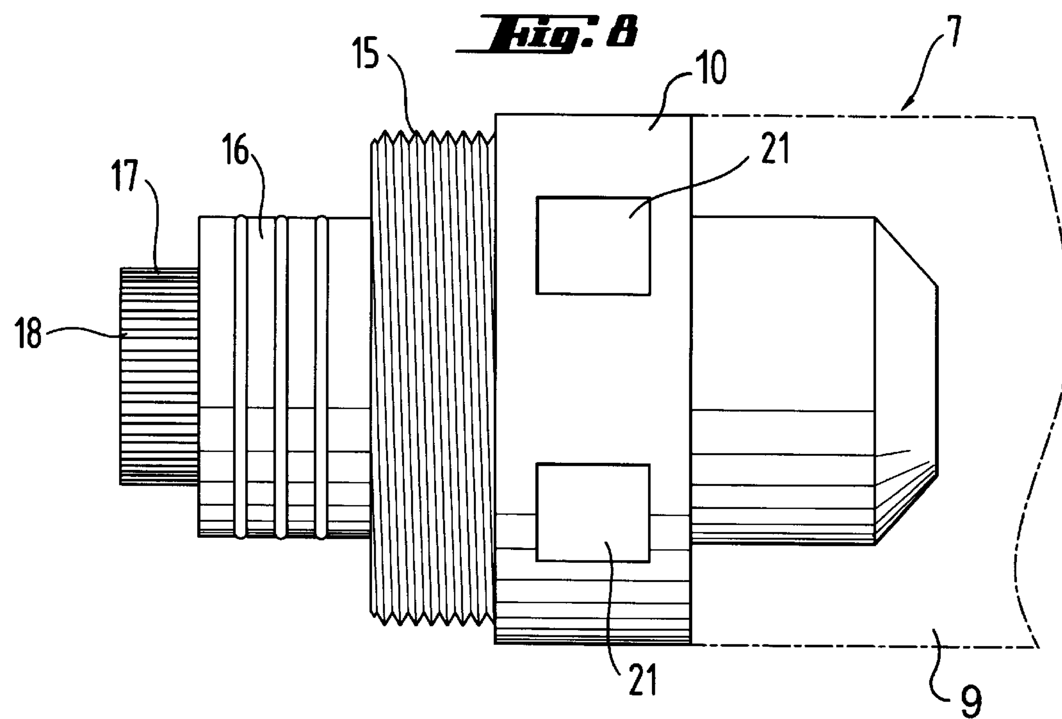

Referring to FIG. 8, the connection member 10 comprises a main connection body of the same exterior cross-sectional shape and size as the flexible member 9 and three segments 15, 16 and 17 of progressively smaller diameter. The segment 15 is externally threaded for engaging the internal screwthread of the tightening ring 13. The segment 16 is formed with grooves which receive O-rings providing a water tight seal with the internal surface of the frame 14. The smallest segment 17 is provided with electrical connector strips 18.

The end of the flexible member 9 and the connection member 10 define respective recesses which together form a cavity accommodating a device box 20 (see FIG. 9), containing known valves and other control devices (not shown).

A compressor (not shown) aboard the towing vessel is connected to the pulling end of the cable-like assembly 5 and compressed gas, such as air, at very high pressure, e.g. 200 bar, is supplied from the compressor through a suitable duct in the cable-like assembly to a main discharge valve in the device box 20. The main discharge valve is opened and closed in controlled fashion. The high pressure supply duct may also be connected to a pressure regulator in the device box for supplying compressed gas at a lower pressure, e.g. 3 bar, than supplied to the main discharge valve for a purpose to be explained.

The main body of the connection member 10 is formed at its circumference with discharge apertures 21 for compressed gas. When the main discharge valve opens, high pressure compressed gas is released into the surrounding water through the apertures 21 and creates a pressure impulse. Hydrophones, which may be of known construction, detect variations in pressure in the surroundings of the gun array during the shot cycle.

Figure 9:
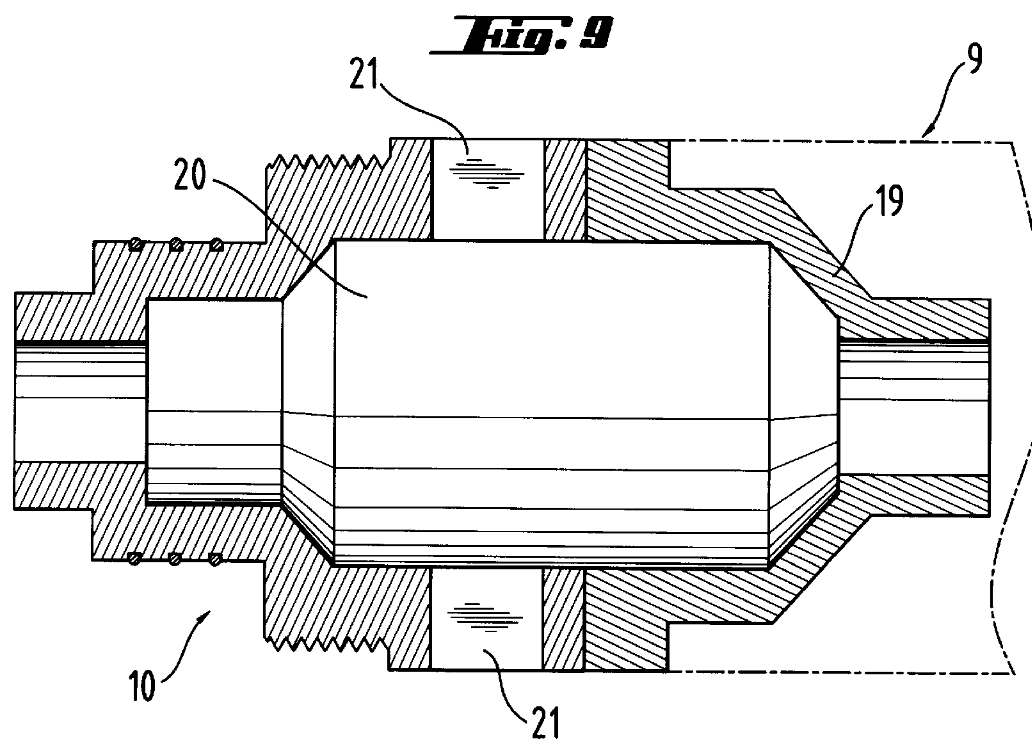

Referring to FIG. 9, the recess in the end of the flexible member is provided by an end portion 19 of the flexible member. The end portion 19 includes a connection nipple for connecting to the high pressure supply duct.

Figure 10:
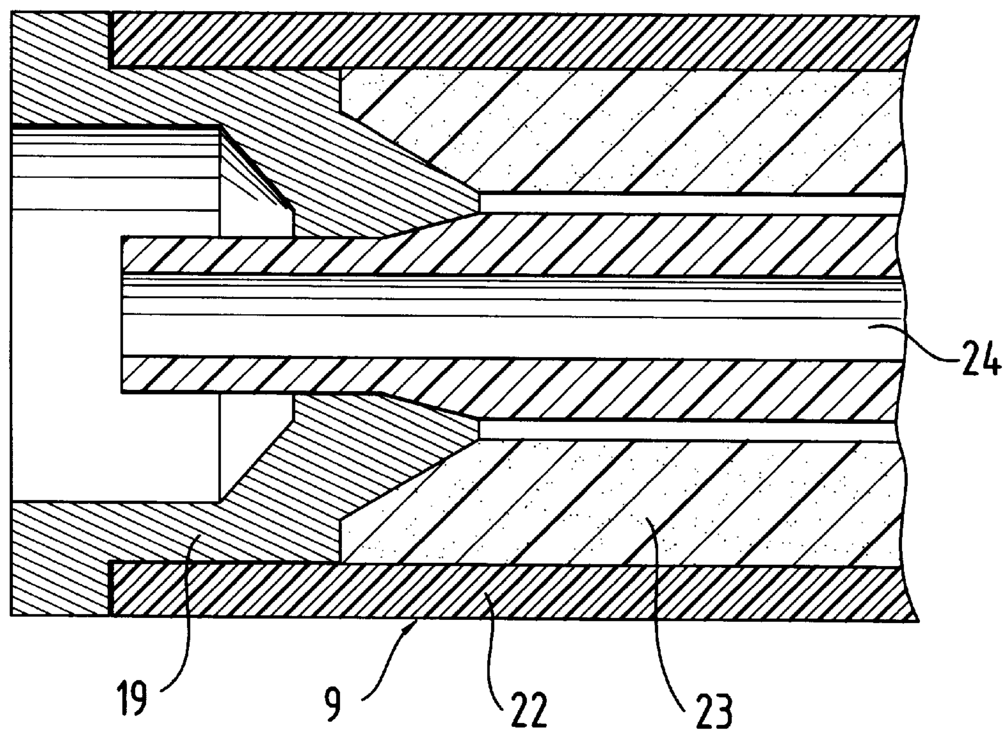

FIG. 10 shows in more detail an alternative structure of the flexible member 9. At the outside of the flexible member 9 shown in FIG. 10 there is a flexible cover or jacket 22, which may be reinforced by fibers or wires or other structural elements. Passing centrally through the flexible member 9 is the high pressure supply duct, which defines a passageway 24. There may be a spongy or cellular mass 23 in the annular space between the high pressure supply duct and the cover 22. The end of the high pressure supply duct is fitted in a sleeve portion of the end portion 19.

Water from the surrounding body can enter the annular space between the high pressure supply duct and the cover 22, and low pressure compressed gas supplied by the pressure regulator can be introduced into, or vented from, the annular space under control of valves (not shown) in the device box. This allows the density of the spongy mass 23 to be varied by changing its water/gas content. Hence, the buoyancy of the flexible member shown in FIG. 10 can be decreased by venting gas from the annular space so that water can enter the space whereas the buoyancy can be increased by supplying compressed gas to the annular space and displacing water from the space.

A floating module 11 according to FIG. 4 is used for adjusting the buoyancy and changing the configuration of the towed assembly 5. The structure of the floating module 11 is to a large extent like the structure of the gun module 7 and it has a connection member 12 at each end allowing connection of the floating module 11 as part of the towed assembly 5. The floating module 11 may also have some functions like the connection member 10 of the gun module 7. For example, it might include a device box containing a pressure regulator, whereby the buoyancy of the floating module may be changed in the manner described (in the case of the air gun module) with reference to FIG. 10. The connection member 12 of the floating module 11 is similar to the connection member 10 of the gun module 7, except that the main body of the connection member 12 is not provided with discharge apertures.

Figure 11:
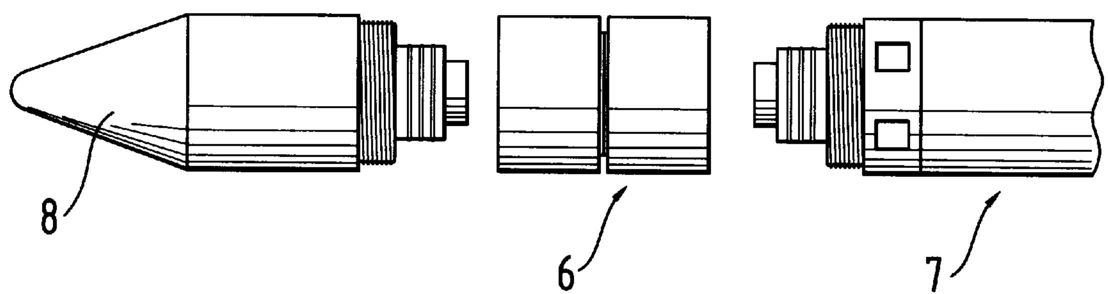

The terminating member 8 includes an integral connecting portion similar to the connecting member 12. FIG. 11 shows how the terminating member 8 is connected by means of a joint member 6 at the end of the towed assembly. Thereby, a waterproof end seal of the towed assembly 5 is obtained. The outer dimensions of the terminating member 8 are uniform with the dimensions of the modules 7 and 11 of the towed assembly 5.

When two connecting members are properly engaged with the joint member 6, the joint member 6 creates a tight and mechanically strong connection between the modules. In particular, the O-rings in the grooves of the segment 16 prevent penetration of water to the segment 17. When the modules are connected together by the joint member 6, the connector strips 18 allow electric control signals and operating power to be delivered to the air gun modules from the vessel 2. Further, they allow compressed air to be supplied from the compressor to the air gun modules and to the floating modules.

FIG. 6 shows that the completed joint of FIG. 5 has a uniform outer form. The joint portion is relatively short compared to the length of the flexible member 9.

Since the towed assembly is flexible and is uniform in external cross-sectional shape and size over its length, it can be reeled on a drum of suitable diameter, typically 2–5 m, which makes it relatively easy to handle the towed assembly during launching and retrieval, and also facilitates transfer of the assembly, reeled on the drum, to another vessel.

The invention is not limited to the embodiments shown, but several modifications thereof are feasible within the scope of the attached claims.

We claim:

1. A sound source arrangement for use in carrying out a seismic survey, comprising a plurality of flexible structural modules connected together end-to-end to form an elongated flexible structure of substantially uniform exterior cross-sectional shape and size which can be stored on a reeling unit and may be unwound from the reeling unit at a survey location and wound back onto the reeling unit without disconnecting the modules from one another, and wherein at least one of the flexible modules is an air gun module which includes a device for producing sound impulses.

2. A sound source arrangement according to claim 1, wherein each flexible structural module between the air gun module and a pulling end of the elongated flexible structure includes a means defining a passageway for leading compressed gas through the module, whereby gas can be supplied to the device for producing sound impulses from a source of compressed gas connected to the elongated flexible structure at the pulling end thereof.

3. A sound source arrangement according to claim 2, wherein the device for producing sound impulses includes a means for controlling duration of sound impulses produced by the device for producing sound impulses and length of interval between consecutive sound impulses.

4. A sound source arrangement according to claim 1, wherein the air gun module includes a flexible, cellular body and a means for selectively filling the body with ambient water.

5. A sound source arrangement according to claim 1, wherein the air gun module includes a tubular flexible cover defining a chamber and a flexible, cellular body inside the chamber, and a means for selectively displacing and admitting water respectively from and to the chamber to control buoyancy of the air gun module.

6. A sound source arrangement according to claim 1, comprising a means for controllably feeding gas to the elongated flexible structure to control floating depth thereof.

7. A sound source arrangement according to claim 1, wherein the elongated flexible structure includes depth control devices for controlling floating depth of the elongated flexible structure.

8. A sound source arrangement according to claim 1, wherein each flexible structural module includes connector elements at each end for delivering a signal or energy to, or receiving a signal or energy from, an adjacent flexible structural module of the elongated flexible structure, and the connector elements of a first module are automatically electrically and pneumatically connected with the connector elements of a second module when the first and second modules are mechanically connected together.

9. A sound source arrangement according to claim 1, wherein each module has a flexible cover.

10. A sound source arrangement according to claim 1, comprising joint members mechanically connecting the flexible structural modules together end-to-end, and wherein each flexible structural module includes connector elements at each end for delivering a signal or energy to, or receiving a signal or energy from, an adjacent flexible structural module of the elongated flexible structure, and the connector elements of a first module are automatically electrically and pneumatically connected with the connector elements of a second module when the first and second modules are mechanically connected together by a joint member.

* * * * *

UNITED STATES PATENT AND TRADEMARK OFFICE

CERTIFICATE OF CORRECTION

PATENT NO. : 6,046,959
DATED : April 4, 2000
INVENTOR(S) : Pekka Salmi, Pekka Jaakola and Erkki Jalkanen It is certified that error appears in the above-identified patent and that said Letters Patent is hereby corrected as shown below:

Title page,
Following the information already in item [73] add
-- Georesearch Engineering E. Jalkanen & Co., Helsinki, Finland --

Signed and Sealed this

Eighth Day of April, 2003

JAMES E. ROGAN
*Director of the United States Patent and Trademark Office*